United States Patent [19]
Vent et al.

[11] Patent Number: 5,577,836
[45] Date of Patent: Nov. 26, 1996

[54] HEADLAMP FOR VEHICLES

[75] Inventors: Albert Vent, Eningen; Wolfgang Lehmann, Bempflingen, both of Germany

[73] Assignee: Robert Bosch GmbH, Stuttgart, Germany

[21] Appl. No.: 476,274

[22] Filed: Jun. 7, 1995

[30] Foreign Application Priority Data

Jul. 15, 1994 [DE] Germany .......................... 44 25 028.2

[51] Int. Cl.⁶ .................................................... F21M 3/22
[52] U.S. Cl. ............................ 362/61; 362/421; 403/329
[58] Field of Search ............................... 362/61, 70, 289, 362/421; 403/74, 133, 329

[56] References Cited

U.S. PATENT DOCUMENTS

| | | | |
|---|---|---|---|
| 4,142,660 | 3/1979 | Culbertson | 403/329 |
| 4,260,275 | 4/1981 | Chevallier | 403/133 |
| 4,954,932 | 9/1990 | Isenga | 362/61 |
| 4,967,318 | 10/1990 | Ewert et al. | 362/61 |
| 5,483,425 | 1/1996 | Luallin et al. | 362/421 |

FOREIGN PATENT DOCUMENTS

| | | | |
|---|---|---|---|
| 0313779 | 3/1989 | European Pat. Off. | |
| 2252595 | 8/1992 | United Kingdom | 403/74 |

*Primary Examiner*—Denise Gromada
*Assistant Examiner*—Sara Sachie Raab
*Attorney, Agent, or Firm*—Michael J. Striker

[57] ABSTRACT

The headlamp has a housing in which a reflector is arranged adjustably. Engaging on the reflector is an adjusting element which can be moved along its longitudinal axis to make an adjustment. At its end, the adjusting element has a ball head which is arranged in a ball socket connected to the reflector. At the transition between the adjusting element and the ball head there is, over part of the circumference, a flattened portion by which a shoulder is formed. Over the rest of the circumference the transition from the adjusting element to the ball head is stepless. The ball socket has a resilient locking member which can engage on the shoulder, in a rotational position of the adjusting element, to secure the ball head from being pulled out. In another rotational position, the locking member engages on the stepless transition between the adjusting element and ball head so that the ball head can be pulled out of the ball socket and the adjusting element can be removed.

6 Claims, 1 Drawing Sheet

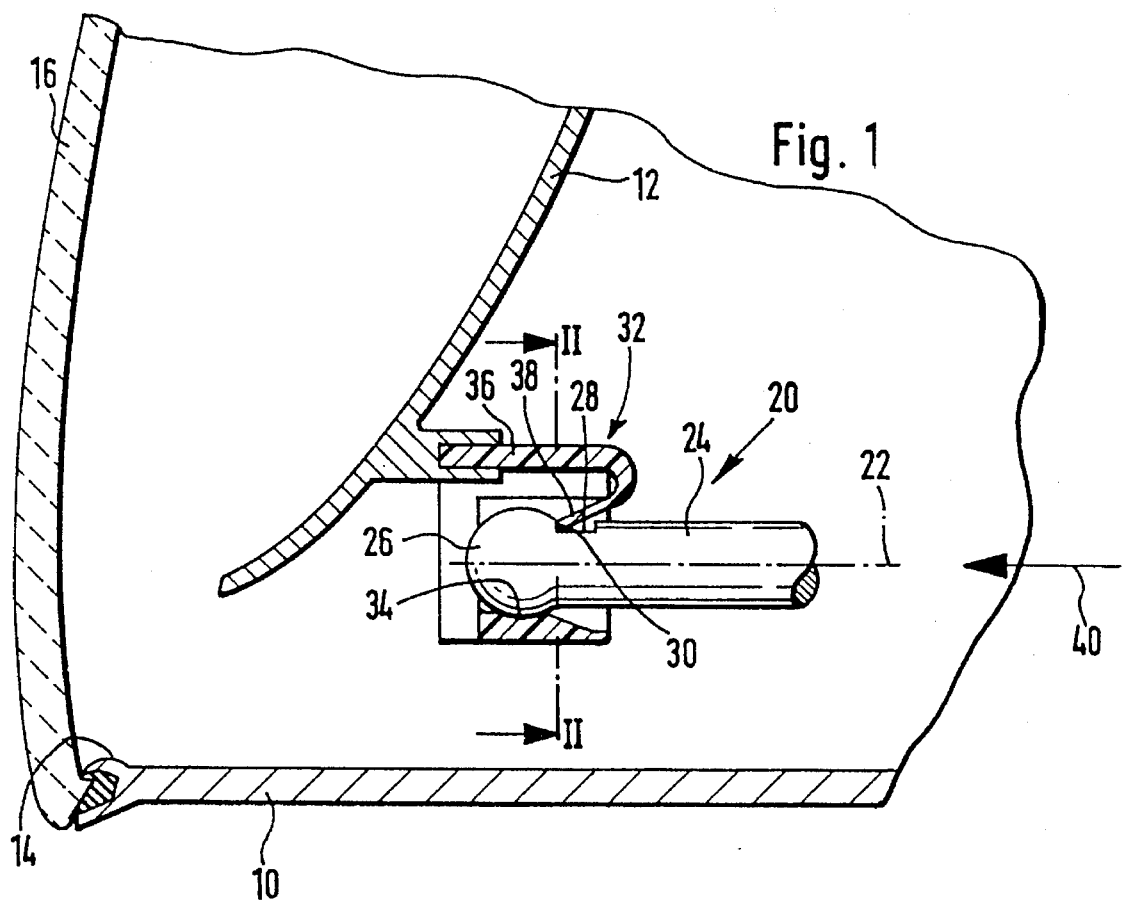
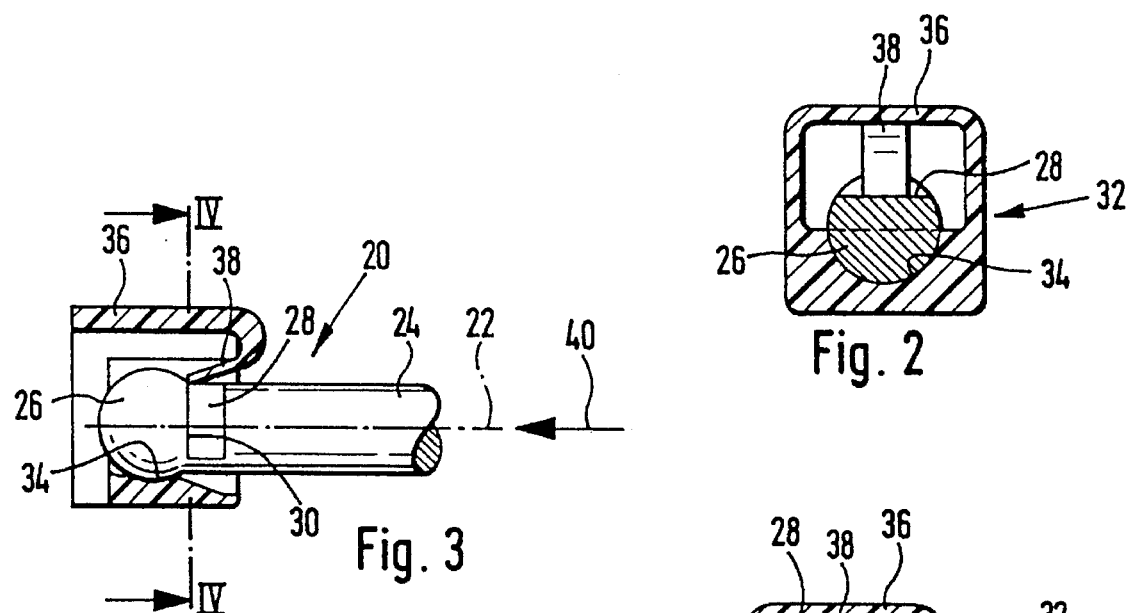
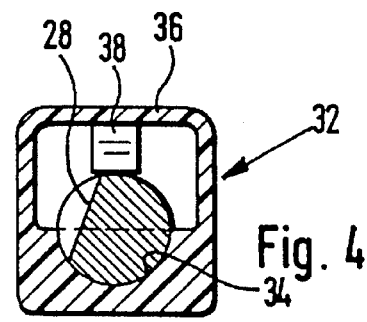

HEADLAMP FOR VEHICLES

BACKGROUND OF THE INVENTION

The invention relates to a headlamp for vehicles.

A headlamp disclosed by EP 0 313 779 A1 has a reflector which is mounted adjustably on a mounting base in the form of a housing. To make an adjustment of the reflector an adjusting element is provided which is connected at least indirectly to the reflector. At its end, the adjusting element has a ball head which is arranged in a ball socket connected to the reflector. An annular shoulder is formed at the transition between the adjusting element and the ball head, on which annular shoulder a resilient locking member in the form of a spring arm engages to secure the ball head against being pulled out of the ball socket. The locking member is of two-armed design and is mounted pivotably in its central region. One arm of the locking member engages on the annular shoulder and, for removal of the adjusting element, the other arm can be acted upon by a tool so that the locking member can be pivoted away from the annular shoulder and the ball head can subsequently be pulled out of the ball socket. This design of the locking member is complex and, in addition, it may possibly be difficult, if not impossible, to see into said locking member, to operate it, where installation conditions on the headlamp are restricted, so that there are certain difficulties in fitting the tool correctly.

SUMMARY OF THE INVENTION

Accordingly, it is an object of the present invention to provide a headlamp for vehicles, which avoids the disadvantages of the prior art.

In keeping with these objects and with others which will become apparent hereinafter, one feature of the present invention resides, briefly stated, in a headlamp with a reflector mounted adjustably on a mounting base and an adjusting element for adjusting the reflector, which adjusting element is connected at least indirectly to the reflector and has a ball head arranged in a ball socket, with a shoulder formed at a transition from the adjusting element to the ball head and the ball socket having at least one resilient locking member which can engage on the shoulder to secure the ball head against being pulled out of the ball socket, wherein the shoulder is formed only over a part of the circumference of the adjusting element relative to its longitudinal axis, the adjusting is rotatable about its longitudinal axis, and for removal of the adjusting element the ball head is pulled out of the ball socket in a position in which a locking member engages the adjusting element in a circumferential region wherein the shoulder is not formed.

When the headlamp for vehicles is designed in accordance with the present invention, it, in contrast, has the advantage that the adjusting element can be removed in a simple manner, by being rotated and pulled out, it not being necessary to see the adjusting element for this.

In accordance with another feature of the present invention, toward the ball head, the adjusting element has a rod-like portion with a rounded cross-section provided at the transition to the ball head with a flattened portion over a part of its circumference around the longitudinal axis, to form the shoulder.

Still another feature of the present invention is that outside the region in which the shoulder is formed, the transition between the adjusting element and the ball head is stepless.

The ball socket can have a sleeve-like portion which surrounds the ball head and on which the locking member is arranged.

Finally, the locking member can be designed as an arm which runs in the insertion direction of the adjusting element, inclined towards its longitudinal axis, and is deflectable resiliently transversely relative to the longitudinal axis of the adjusting element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 shows a sectional view of a headlamp for vehicles in a longitudinal section with an adjusting element in a first position;

FIG. 2 shows the adjusting element in the section along the line II—II in FIG. 1;

FIG. 3 shows the adjusting element in a second position; and

FIG. 4 shows the adjusting element in the section along the line IV—IV in FIG. 3.

DESCRIPTION OF THE PREFERRED EMBODIMENTS

A headlamp shown in FIGS. 1 to 4 for vehicles, in particular motor vehicles, ha a mounting base in the form of a housing 10 in which a reflector 12 is mounted adjustably. For its adjustment, the reflector 12 can be pivoted around a horizontal and/or vertical axis. Inserted into the reflector 12 is a light source (not shown) of which the light emitted during operation is reflected by the reflector 12 to forma light beam. The housing 10 has a light-exit opening 14 which is closed by a transparent covering plate 16.

For an adjustment of the reflector 12 at least one adjusting element 20 is provided which is arranged eccentrically with respect to the axis around which the reflector 12 is to be pivoted when making an adjustment. To make an adjustment of the reflector 12 the adjusting element 20 is moved along its longitudinal axis 22, which results in the reflector 12 being pivoted about the particular axis and the direction of the light beam reflected by said reflector being adjusted. The adjusting element 20 may be operated manually from outside the headlamp housing 10 or may be part of a device for adjusting the light range of the light beam emitted by the headlamp and may be operated by an automatic drive. Toward the reflector 12 the adjusting element 20 has a rod-like portion 24 which is designed such that it is rounded, for example circular, in cross-section. At its end pointing toward the reflector 12 the adjusting element 20 is provided with a ball head 26. Formed over part of the circumference of the adjusting element 20, at the transition between the rod 24 and the ball head 26, is a flattened portion 28 which represents a recess since because of this the cross-section of the adjusting element 20 is reduced in size compared to its remaining circumference. The flattened portion 28 results in a shoulder 30, which points away from the ball head 26, being formed at the transition between the ball head 26 and rod 24. The shoulder 30 is arranged approximately perpendicularly with respect to the longitudinal axis 22 but may also be arranged at another angle transversely with respect to the longitudinal axis 22. The flattened portion 28 extends over less than half of the circumference of the adjusting element 20 and where the flattened portion 28 is not formed there is no step at the transition between the ball head 26 and the rod 24. Outside the flattened portion 28 the transition between the rod 24 and the ball head 26 may be rounded or, as the Figures show, may be such that the ball head 26 reaches as far as the circumference of the rod 24 where, although there is a bend, there is no offset and no step. The adjusting element 20 may be made, for example, of plastic or metal.

Connected to the reflector 12 is a socket 32 for the ball head 26 of the adjusting element 20, which socket may, alternatively, also be formed in one piece with the reflector 12. The ball socket 32 is arranged on the rear side of the reflector 12, i.e. on its side pointing away from the covering plate 16. The adjusting element 20 is connected indirectly to the reflector 12 via the ball socket 32, if the latter is designed as a separate part connected to the reflector 12, or is connected directly, if the ball socket 32 is designed in one piece with the reflector 12. The ball socket 32 has a step bearing 34 in which the ball head 26 is received pivotably and in which the ball head 26 can rest with only part of its surface, or with its entire surface. In the exemplary embodiment shown, the ball head 26 rests in the step bearing 34 with only part of its surface pointing approximately radially away from the longitudinal axis 22. The step bearing 34 widens approximately conically away from the rear side of the reflector 12. In addition, the ball socket 32 has a sleeve-like portion 36 which is formed in one piece with the step bearing 34, surrounds the latter and in cross-section, i.e. viewed in the direction of the longitudinal axis 22, may be of angular or round design. Furthermore, the ball socket 32 has a resilient locking member 38 which, in the exemplary embodiment, is formed as a resilient arm. The locking member 38 is arranged such that, with respect to the longitudinal axis 22, it lies opposite the step bearing 34 and, with its one end region, is integrally formed on that edge region of the sleeve 36 which points away from the reflector 12, and with its other, free end points toward the reflector 12. That portion of the locking member 38 which lies between its ends runs inclined with respect to the longitudinal axis 22, to be precise, in a manner such that it approaches the longitudinal axis 22 toward the reflector 12. By its free end the locking member 38 can be moved in a resilient manner radially with respect to the longitudinal axis 22. the ball socket 32 is preferably made of elastically deformable plastic.

In the following the installation and removal of the adjusting element 20 are explained. For its installation, the adjusting element 20 is inserted along its longitudinal axis 22, in the direction of the arrow 40 in FIG. 1, by its ball head 26 into the ball socket 32. In this arrangement, it is insignificant in which rotational position about its longitudinal axis 22 the adjusting element 20 is, there just needs to be a fore applied to said adjusting element, in the arrow direction 40, whereupon the ball head 26 enters into the ball socket 32, this being facilitated by the widening of the step bearing 34 conically away from the rear side of the reflector 12. In this arrangement, locking member 38 pivots resiliently and radially outward until the ball head 26 is arranged in the step bearing 34. In this position of the ball head 26, the locking member 38 again pivots radially inward and in a rotational position of the adjusting element 20, in which the flattened portion 28 thereof is arranged in the circumferential region of the locking member 38, projects into the flattened portion 28. The adjusting element 20 is shown in this position in FIGS. 1 and 2. In this arrangement, the locking member 38 engages with its free end on the shoulder 30, or is arranged at a small distance, in the direction of the longitudinal axis 22, from the shoulder 30 in order to enable easy pivoting of the ball head 26. Due to the locking member 38 the ball head 26 is secured against being pulled out of the ball socket 32 counter to the arrow direction 40.

For its removal, the adjusting element 20 is brought, by rotation about its longitudinal axis 22, into a position, shown in FIGS. 3 and 4, in which the flattened portion 28 is arranged in a different circumferential region from the locking member 38. In this arrangement, the locking member 38 engages on the rounded circumference of the adjusting element 2, at the transition between the ball head 26 and the rod 24, which transition is without a step and without an offset, and, as a result, the locking member 38 cannot be hooked on here. The locking member 38 is pivoted approximately radially outward with respect to the position in which it projects into the flattened portion 28. By the adjusting element 20 being pulled counter to the arrow direction 40, the locking member 38 slides, with resilient pivoting, radially outward onto the ball head 26 and the ball head 26 can be pulled out of the ball socket 32.

The adjusting element 20 need not necessarily have the flattened portion 28, rather the shoulder 30 may also be formed in another manner, for example by means of a notch, the shoulder, however, not extending over the entire circumference of the adjusting element 20.

It will be understood that each of the elements described above, or two or more together, may also find a useful application in other types of constructions differing from the types described above.

While the invention has been illustrated and described as embodied in a headlamp for vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A headlamp for vehicles, comprising a mounting base; a reflector mounted adjustably on said mounting base; at least one adjusting element provided for adjusting said reflector and connected at least indirectly to said reflector, said adjusting element having a ball head and a ball socket in which said ball head is arranged; a shoulder provided at a transition from said adjusting element to said ball head, said ball socket having at least one resilient locking member which is engageable on said shoulder to secure said ball head against being pulled out of said ball socket, said shoulder being formed only over one part of a circumference of said adjusting element relative to a longitudinal axis of said adjusting element, said adjusting element being rotatable about said longitudinal axis, said ball head and said ball socket being formed so that for removal of said adjusting element, said ball head is pulled out of said ball socket in a position in which said locking member engages on said adjusting element in a circumferential region in which said shoulder is not formed.

2. A headlamp as defined in claim 1, wherein said adjusting element has a rod-like portion with a rounded cross-section which is provided at the transition to said ball head with a flattened portion over a part of said circumference around said longitudinal axis so as to form said shoulder.

3. A headlamp as defined in claim 1, wherein outside a region in which said shoulder is formed, the transition between said adjusting element and said ball head is stepless.

4. A headlamp as defined in claim 2, wherein outside a region in which said shoulder is formed, the transition between said adjusting element and said ball head is stepless.

5. A headlamp as defined in claim 1, wherein said ball socket has a sleeve-like portion which surrounds the ball head, said locking member being arranged on said sleeve-like portion.

6. A headlamp as defined in claim 5, wherein said locking member is formed as an arm extending in an insertion direction of said adjusting element and inclined toward said longitudinal axis of said adjusting element, said arm being deflectable resiliently transversely relative to said longitudinal axis of said adjusting element.

* * * * *